Oct. 29, 1968     J. C. VARKALA     3,407,723
BACON COOKER
Filed Jan. 16, 1967
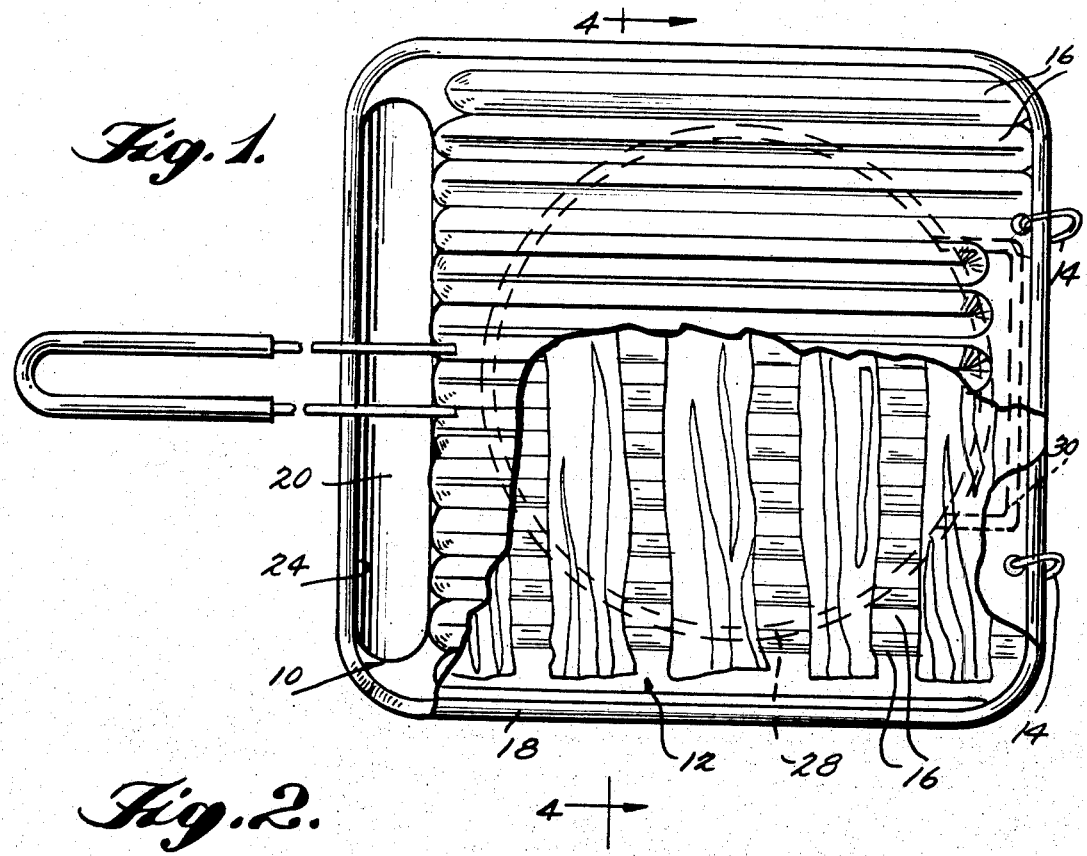
Fig. 1.
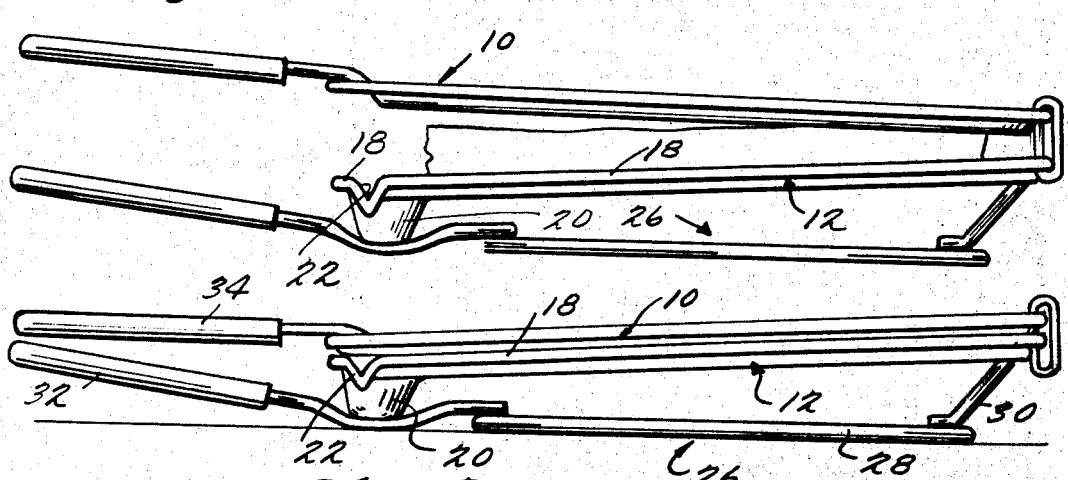
Fig. 2.
Fig. 3.
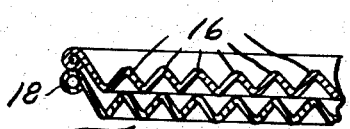
Fig. 4.
INVENTOR.
JOSEPH C. VARKALA
BY
Cushman, Darby & Cushman
ATTORNEYS

United States Patent Office 3,407,723
Patented Oct. 29, 1968

3,407,723
BACON COOKER
Joseph C. Varkala, 131 Llewellyn Road,
Montclair, N.J. 07042
Filed Jan. 16, 1967, Ser. No. 609,423
3 Claims. (Cl. 99—349)

ABSTRACT OF THE DISCLOSURE

A bacon, or other meat, cooking device includes two corrugated plates which are positioned one over the other and connected together to accommodate varying thicknesses of meats between the two plates. Each of the separate plates includes a handle so that the plates can be separated from one another when it is desired to insert or remove meats. A lower plate of the pair includes a drainage trough into which grease may collect from the cooking of the meat, and the drainage trough includes pouring portions for permitting a removal of collected grease from the trough. The upper plate of the pair is constructed to provide a visual indication of the amount of grease collecting in the lower plate drainage trough so that a user may at all times be aware of the amount of grease collecting. Also, the device includes a base support which is constructed to provide a slight tilt to the entire device when it is in a closed position for cooking meats, and the tilt of the device is in the direction of the drainage trough so that all grease which is being cooked out of the meat will flow in a natural way down into the trough.

Brief description of invention

This invention relates to a device for cooking meats and other food products, and the device is especially useful for cooking bacon or other flat meat portions over an open fire or in a broiler.

It is known in the prior art to provide for a cooking of meat between spaced plates, and such prior art devices have been generally useful for outdoor cooking requirements where there is little concern about spattering of grease and spillage of grease into an open fire. Further, it is known to provide for relatively costly broiler constructions which may be used in the home and which provide for a containment of grease and spattering within the broiler itself. However, the prior art has not provided for a low cost device which may be utilized for cooking bacon, or other meats, in the home as well as on a grill outdoors, and the present invention is directed to an improved cooking device which includes a combination of features for better handling the cooking of bacon or any meat which produces a relatively large amount of grease during a cooking process.

In cooking bacon, and certain other meats, there is a problem of grease spattering during the cooking process, and there is a further problem of grease accumulating in and around the meat while it is cooking. Some prior art devices have attempted to reduce spattering by covering bacon strips with metal foil or with a cover plate (see U.S. Patent 2,849,949), and further, attempts have been made to drain grease away from the cooking meat and into a reservoir portion of a utensil. Despite efforts to reduce spattering and grease accumulation with such prior devices, there has not been developed a device which permits a housewife to adequately and safely handle grease from bacon which is cooking, while at the same time obtaining a desirable and even cooking of the bacon. The present invention solves the problems of cooking bacon by providing an improved device which (a) conducts heat to opposite surfaces of the bacon while maintaining the bacon strips in a flat condition, (b) provides for a continuous drainage of grease away from bacon while it is cooking, (c) collects all drained grease into a drainage trough for periodic removal by the user of the device, (d) provides a visual determination of the amount of collected grease without interfering with the cooking operation, and (e) provides for a removal of the grease from the drainage trough without interrupting the cooking process or interfering with the positioning of bacon in a flat condition within the device. Further, the above listed advantages of the improved device are coupled with the feature of confining substantially all cooking grease to within the unit itself so as to reduce smoking and to effectively eliminate any problems of spattering or spillage of grease in an oven or on a stove.

The device of the invention comprises two corrugated plates which are hinged together so that meat can be received between the two plates. The hinging arrangement is constructed to permit the receipt of varying thicknesses of meat between the plates, and in their operative positions the two separate plates contact separate surfaces of the meat which is to be cooked. Each of the plates includes a handle portion extending out from one edge, and in the preferred arrangement both handles are arranged on a common side of the device so that both handles may be grasped at the same time.

One of the plates which makes up the pair of plates in the device will function as a lower surface for supporting the meat and for continuously draining off grease which is being cooked out of the meat. The lower plate includes a drainage trough at one end thereof, and the plate is constructed to provide a natural drainage of grease from all portions of the plate into the drainage trough. The drainage trough is further provided with one or more pouring spouts so that collected grease can be periodically drained from the device. The lower plate includes uprising marginal wall portions which serve to confine the meat and grease within the perimeter of the device, and there is no danger of grease flowing out over the edges of the device and into an open fire or an oven.

The upper plate of the pair is constructed from corrugated material in a similar manner to that of the lower plate. The upper plate also includes an opening through a portion which immediately overlays the drainage trough, and the opening functions to permit a visual examination of the drainage trough. In this manner, there is provided a means for determining the level of collected grease in the drainage trough at all times, and a user can pour off grease at the proper times without interfering with the cooking operation.

A support means is provided for the entire device to support the pair of plates and their handles on a grill surface or any other cooking surface. The support means is constructed to provide a slight tilt to the entire device, and the tilt is in a direction toward the location of the drainage trough. This arrangement provides for a natural flow of grease from cooking meat into the drainage trough.

These and other advantages of this invention will become apparent in the more detailed discussion which follows, and in that discussion reference will be made to the accompanying drawings in which:

FIGURE 1 is a top plan view of the improved cooking device with a portion of the upper plate removed to illustrate the relationship of the pair of plates to strips of bacon included therebetween;

FIGURE 2 is a side elevational view of the device of FIGURE 1, and the pair of plates are slightly spaced apart to receive a piece of flat meat therebetween;

FIGURE 3 is a side elevational view similar to FIGURE 2 illustrating the cooking device with the pair of plates fully closed against one another for cooking bacon or other thin strips of meat; and FIGURE 4 is a cross-sectional view taken on line 4—4 of FIGURE 1.

Detailed description of invention

Referring to FIGURE 1, the improved device of this invention is shown as including a pair of plate members which are similar in dimensions and constructions and which are arranged to overlay one another in parallel planes. In the illustration of FIGURE 1, an upper plate 10 of the pair is partially cut away to reveal a lower plate 12 of the pair. Also strips of bacon have been illustrated to show the flat positioning of meat between the two plates during a cooking operation. As shown, the two plates are hinged together by metal rings 14 which are constructed to permit a limited adjustment of the two plates 10 and 12 in their spaced positions from one another. As further shown in FIGURES 2 and 3, the upper plate 10 can be lifted to parallel and spaced positions from the lower plate 12 so as to receive varying thicknesses of meat for cooking. In the cooking of bacon, which is a very thin type of food product, the plates are placed one upon the other substantially as shown in FIGURE 3. On the other hand, a thicker piece of meat, as shown in FIGURE 2, requires a parallel spacing of the two plates from one another, and the hinge means 14 permit such an adjustment to varying thicknesses of meats.

Both plates are constructed from any suitable sheet metal material, and preferably both plates are corrugated, as shown. The corrugations 16 are arranged to extend substantially across one whole dimension of the device so as to provide a series of closely spaced channels along which grease may be caused to flow away from the cooking meat. In the usual cooking operation contemplated by this device, the meat portions would contact ridges formed by the corrugations of the lower plate 12, and this would leave drainage channels between each of the ridges for receiving and removing grease from the cooking meat. As shown in FIGURE 4, the plate 12 further includes an upstanding edge 18 which is continuous about the entire margin of the plate and which functions as a confining means to prevent a flow of grease over any of the peripheral edges of the device. Also, the marginal edge 18 serves as a support to maintain the upper plate 10 in a slightly spaced position from the lower plate 12. This prevents the pressing of bacon into the channel portions of the corrugations in the lower plate, thereby maintaining the bacon in a substantially flat condition and out of any grease which is flowing along the channels.

The lower plate 12 includes a drainage trough means 20 which is formed from the same sheet of metal that forms the remainder of the lower plate. The drainage trough 20 may be of any suitable dimension, but preferably, the trough is constructed to extend across one complete edge of the device so as to receive a flow of grease from the entire surface of the lower plate 12. In the illustrated embodiment, the drainage trough 12 extends across one edge of the device and at right angles to the corrugations 16 so as to receive grease drainage from each of the separate channels formed by the separate corrugations. Thus, the device provides for a ready drainage of grease away from the surfaces of the meat which is being cooked, and from there, the grease is caused to flow to a common collecting point for ultimate removal from the device. This arrangement provides for a desired cooking of bacon and other meats wherein it is preferred to keep all grease away from the meat surfaces and to remove the grease as soon as possible from the cooking implement. The drainage trough 20 is further provided with one or more pouring spouts 22, and in the preferred arrangement a separate spout 22 is formed at each end of the drainage trough. With this arrangement, the user of the device can remove grease by simply tilting the entire device toward one end or the other of the drainage trough so as to pour the collected grease into any suitable receptacle. Of course, it should be apparent that the removal of grease can be accomplished without separating the two plates 10 and 12 and without removing or otherwise disturbing the meat which is being cooked therebetween.

The upper plate 10 is constructed to have similar dimensions to the lower plate 12 so that the two plates can be placed tightly against opposite surfaces of a meat product. This provides for a rapid conduction of heat to both surfaces of the meat, and spattering of grease is substantially eliminated because of the confining arrangement of the two plates relative to one another and to the meat. Also the upstanding marginal edge 18 of the lower plate 12 serves to seal the edges of the device by contacting the upper plate 10 on all sides, and this substantially eliminates the escape of any spattering grease out of the device. In order to provide a means for visually checking on the level of grease which has accumulated in the lower plate drainage trough 20, there is provided an opening 24 through the upper plate. The opening 24 may be constructed to completely overlay the region of the drainage trough 20, and by this means it is possible to look directly into the drainage trough during a cooking process and without disturbing the meat which is being cooked. It is also contemplated that the upper surface of the upper plate 10 may occasionally be used as a separate cooking surface so that it would be possible to have a layer of bacon and something else cooking at the same time. Accordingly, the upper plate 10 includes uprising wall sections about its margins, as discussed above for the lower plate, and corrugations 16 are provided in the same fashion as discussed for the lower plate 12. Also, the opening 24 through the upper plate 10 permits a drainage of all grease from all of the corrugation channels of the upper plate down into the drainage trough 20 of the lower plate. Thus, the device may be adapted to varying cooking requirements.

A further feature of the improved device of this invention resides in the support means 26 associated with the base plate 12 of the device. The support means functions to support the entire device above a grill or cooking surface, and additionally the support means is constructed to provide a predetermined tilt to the entire device so that all grease will naturally flow by gravity toward and into the drainage trough 20 at one end of the device. The illustrated support means 26 is made up of a ring member 28, and the ring may be formed from heavy wire stock material. The ring member 28 is connected to an upright spacing member 30 which spaces the pair of plates 10 and 12 a predetermined distance from a grill surface under the ring member 28. The spacing member 30 is of such a dimension that the plates 10 and 12 are spaced from the grill surface at a higher level at one end of the device as compared to an opposite end of the device. In the construction shown, the higher end of the device is opposite from the drainage trough 20, and this causes grease to flow along the upper surface of the plate 12 and into the drainage trough. The level of the lower end of the device may be determined by the drainage trough itself since the trough extends downwardly from the lower surface of the plate 12. However, in the illustrated form of the invention, a handle means 32 extends beneath the drainage trough and is connected to the ring 28, as shown. The handle means 32 may also be connected, as by welding, to the lower surface of the drainage trough itself so as to provide a firm attachment of the handle to the lower plate and to the support means associated therewith. A similar handle 34 is attached to the upper plate 10, and in the preferred arrangement, the two handles extend outwardly from the device in an overlaying relationship so that both handles may be grasped at the same time by a user of the device.

In use, the upper handle 34 is lifted to lift the upper plate 10, and strips of bacon or other meat can then be placed on the upper surface of the lower plate 12. Then, the upper handle 34 and the plate 10 are lowered to the positions shown in FIGURES 2 and 3 to cause both of the plates 10 and 12 to contact opposite surfaces of the meat contained therebetween. This assists in maintaining the meat portions in a flat condition while being cooked, and also heat is conducted from each of the plates 10 and 12 to the opposite surfaces of the meat, thereby cooking both sides of the meat without having to turn over the meat or the device. While cooking is progressing, the user can maintain a check on the amount of grease collecting in the drainage trough 20, and periodically the grease can be removed by grasping both handles 32 and 34 and tilting the entire device so as to empty the grease into a receptacle. The removal of grease is accomplished without separating the separate plates 10 and 12 and without disturbing the cooking operation which has already started. The condition of the meat and the degree of cooking of the meat can be checked by merely lifting the upper plate 10 and visually inspecting the meat. When the cooking process is completed, the upper plate 10 is lifted upwardly and out of the way so that the finished meat can be removed. With the support means 26 which is associated with the device, the device may be placed over an open fire on a grill or in an oven or broiler unit. The marginal walls 18 around the plates of the device substantially eliminate any undesired spattering of grease from the cooking of the meat, and all grease is confined to the device itself and to the drainage trough 20 therein.

Having described the features and use of the device, it can be seen that there is provided an improved device for cooking meats. Variations in the described embodiment will become apparent to those skilled in the art, and such variations are intended to be included within the scope of this invention.

What is claimed is:

1. A device for cooking bacon, and other meats, while maintaining the meats in a flat condition during the cooking process, said device comprising:

a pair of plates for receiving meat therebetween and for contacting opposite surfaces of the meat for conducting heat to opposite surfaces of the meat, said pair of plates including a lower plate for supporting the meat, said plate having a plurality of channels formed therein to receive grease from the cooking meat, and including an upstanding edge about its entire margin for preventing spillage of grease over the sides of the plate and for forming a grease seal relative to an upper plate of said pair, said lower plate further including a drainage trough formed along one edge and at right angles to said plurality of channels for collecting grease from all of said channels, an upper plate which is connected to said lower plate by hinges for movement toward and away from said lower plate, said hinges comprising elements which permit a vertical adjustment in parallel spacing between said upper and lower plates so that varying thicknesses of meat may be accommodated within the device, said upper plate having marginal edge portions for contacting substantially all of the upstanding edge of said lower plate to prevent spillage or spattering of grease from between the two plates, said upstanding edge and said marginal edge portions being positioned to maintain said upper plate in a slightly spaced position parallel to and above said lower plate, whereby meat which is cooking is maintained in a substantially flat condition across said plurality of channels of said lower plate without being pressed downwardly into the channels, and including an opening through said upper plate in a position which overlays at least a portion of said drainage trough in the lower plate, whereby a user can visually determine how much grease has been collected in the drainage trough without separating the plates and without disturbing the meat contained between the two plates, and separate handle means connected to each plate making up said pair of plates.

2. The device of claim 1 and including:

a support means connected to the bottom of the device for supporting said pair of plates away from a surface, said supporting means including a space member which supports one end of said device at a higher level than an opposite end of said device, whereby grease is caused to continuously flow down said channels and into said drainage trough during a cooking process.

3. The device of claim 1 wherein said upper plate is constructed to include a plurality of channels and an upstanding marginal edge so that said upper plate may be used as a separate cooking surface.

References Cited
UNITED STATES PATENTS

| | | | |
|---|---|---|---|
| 1,706,612 | 3/1929 | Jaeger | 99—375 |
| 2,066,507 | 1/1937 | Yost | 99—379 XR |
| 2,652,766 | 9/1953 | Cralle | 99—402 XR |
| 3,010,383 | 11/1961 | Greene | 99—375 XR |
| 3,352,227 | 11/1967 | Litman | 99—375 XR |

FOREIGN PATENTS

| | | |
|---|---|---|
| 725,665 | 3/1955 | Great Britain. |
| 438,252 | 3/1912 | France. |
| 859,708 | 9/1940 | France. |
| 996,722 | 9/1951 | France. |
| 321,814 | 7/1957 | Switzerland. |

WALTER A. SCHEEL, *Primary Examiner.*

J. M. NEARY, *Assistant Examiner.*